3,095,897
BALANCED VALVE AND SEAL CONSTRUCTION
Robert G. Pennstrom, Neptune, N.J., assignor to Union Carbide Corporation, a corporation of New York
Filed Sept. 15, 1959, Ser. No. 840,140
4 Claims. (Cl. 137—454.2)

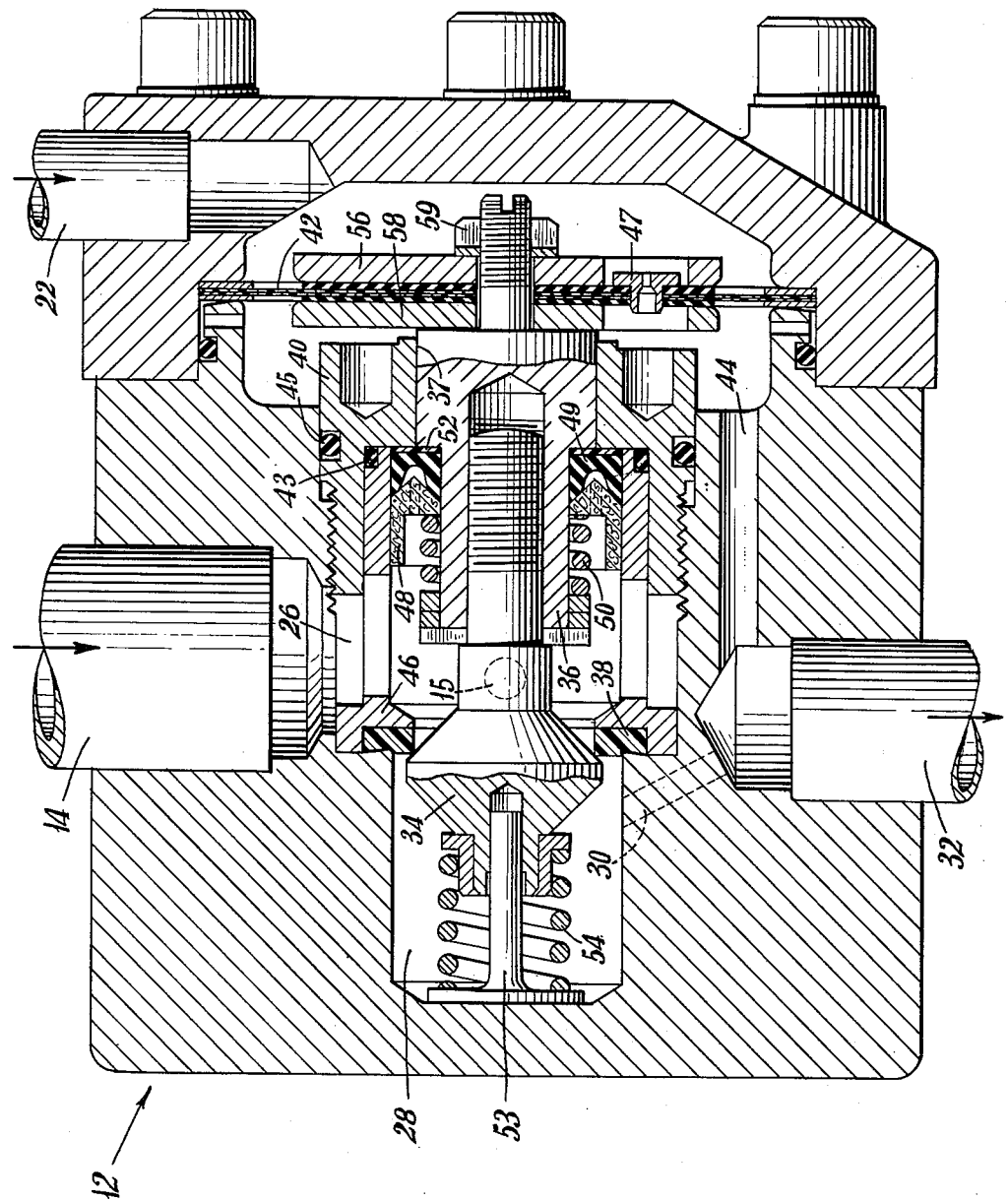

This invention relates to high flow, high delivery pressure regulators and, more particularly, to such a regulator having a balanced-type valve unit which is pilot operated.

The main object of the present invention is to provide a pressure regulator for use where relatively constant high delivery pressures with less than 100 p.s.i. change with a delivery pressure of 2000 p.s.i., are required over widely changing flow conditions from 0 c.f.h. to 100,000 c.f.h.

Other objects are to provide a pressure regulator to withstand operating inlet pressures up to 3500 p.s.i., provide adjustable delivery pressures up to 3500 p.s.i., withstand hydrostatic pressures up to 5840 p.s.i., have an operating temperature range of —65° to +130° F., storage temperature range —80° to +150° F., a delivery pressure differential relief and blowdown controlled by the pressure adjusting screw, and a maximum delivery pressure change of ±15 p.s.i. for any 500 p.s.i. change in inlet pressure at 500 c.f.h. flow.

Further objects are to provide that with an inlet pressure of 3000 p.s.i. and a delivery pressure of 2000 p.s.i., the delivery pressure must not drop more than 100 p.s.i. as the flow varies from 0 to 4500 c.f.h., with an inlet pressure of 1500 p.s.i. and a delivery pressure of 500 p.s.i., the delivery pressure must not decrease more than 100 p.s.i. as the flow varies from 0 to 4500 c.f.h., with any back pressure between 500 and 3000 p.s.i., the blowdown rate must be controllable between at least 100 c.f.h. and 2000 c.f.h., with the regulator adjusted for a "no-flow" delivery pressure between 500 p.s.i. and 3000 p.s.i., the relief valve must vent before the back pressure increases more than 500 p.s.i. above the set "no-flow" pressure and must reseal before the back pressure decreases to the set "no-flow" pressure, and that the capacity of the relief valve must be such that in excess of 1800 c.f.h. is vented before the back pressure has increased to 800 p.s.i. above the set "no-flow" pressure.

The regulator of the invention more than meets all the above listed requirements. The delivery pressure change of the subject regulator is only ±5 p.s.i., it will deliver up to 100,000 c.f.h. before the delivery pressure drops 100 p.s.i., and it will deliver up to 60,000 c.f.h. before the delivery pressure decreases 100 p.s.i.

The single FIGURE is a vertical section through the regulator according to the preferred embodiment of the present invention.

As shown, the main regulator 12 comprises a body having a cavity 26 receiving fluid from the inlet 14, and provided with a socket 28 connected by a passage 30 with the outlet 32 for pressure-regulated fluid. The socket 28 is also connected to the check valve 25 by a passage 27 shown in FIGURE 6. The main valve has a head 34 in the socket 28, and a stem 36 in the cavity 26, and a valve seat 38 between the socket and the cavity having an opening receiving the head 34. A cap 40 is screwed into the cavity 26, and has a central bore of substantially the same diameter as the opening in the valve seat 38. The valve stem 36 has an inlayed bearing 37 slideable in the bore of cap 40.

Secured to the end of the valve stem 36 is a pressure actuator 42, and the space between the cap 40 and the actuator 42 is connected by a passage 44 to the outlet 32. With this construction, the valve stem bearing 37 being of substantially the same diameter as the opening in the valve seat 38, a balanced valve is provided.

The valve seat 38, which is preferably of nylon, is held in position by an annular retainer 46. The cap 40 is counterbored to a larger diameter to receive the retainer 46 and form an internal annular shoulder engaging the top thereof. Gas-tight seals are provided by an O ring 43 between the retainer 46 and the cap 40, and an O ring 45 between the cap 40 and the cavity 26.

The stem bearing 37 forms a shoulder normally in register with the cap shoulder and forming within the top of the retainer 46 an annular recess receiving an annular ring 49 of packing material sealing against leakage between the cap 40 and the bearing 37.

The ring 49 is a channel cross section of resilient material such as silicone rubber. A follower ring 48 has an annular ridge entering the channel, and is provided with a loading spring 50. A washer 52 of flexible Mylar material protects the ring 49 from damage as it is flexed by movement of the bearing 37. The valve head 34 is screwed into the valve stem 36 so as to be separable to receive the washer 52, rings 49 and 48 and loading spring 50 with the spring bearing against the valve head 34. The valve head 34 is centrally bored to receive a guide stem 53 which serves to dampen any vibration or hum and a valve closing spring 54 bears against the head 34 to insure positive closing of the valve.

The pressure actuator 42 in the form shown comprises a diaphragm formed of two discs of .0075 in. thick "Mylar" material, two rubber sealing discs on the outside thereof, and a rivet 47 containing a bleeder hole. The diaphragm is clamped between diaphragm plates 56 and 58 against the stem bearing 37 by nut 59.

What is claimed is:

1. In a pressure regulator comprising a body having a cavity therein provided with an inlet for fluid under pressure to be regulated, a socket formed in said cavity having an outlet for pressure-regulated fluid, a valve having a head in said socket and a stem in said cavity, a valve seat between said socket and said cavity the improvement which comprises an annular retainer for said valve seat, a cap screwed into said cavity having a larger bore surrounding said retainer and a smaller bore with an internal annular shoulder therebetween engaging the top of said retainer, said valve stem having a bearing slideable in said smaller cap bore and a shoulder normally in register with said cap shoulder and forming with the top of said retainer an annular recess, and a ring of packing material in said annular recess sealing against leakage between said bearing and said retainer from said cavity.

2. In a pressure regulator comprising a body having a cavity for fluid under pressure to be regulated, a socket formed in said cavity and having an outlet for pressure regulated fluid, a valve having a head in said socket and a stem in said cavity, a valve seat between said socket and said cavity, the improvement which comprises an annular retainer for said valve seat, a cap screwed into said cavity having a larger bore surrounding said retainer and a smaller bore with an internal annular shoulder therebetween engaging the stop of said retainer, said valve stem having a bearing slideable in said smaller cap bore and a shoulder normally in register with said cap shoulder and forming with the top of said retainer an annular recess, and a ring of packing material of channel cross section in said annular recess sealing against leakage between said bearing and said retainer from said cavity.

3. In a pressure regulator comprising a body having a cavity for fluid under pressure to be regulated, a socket formed in said cavity and having an outlet for pressure regulated fluid, a valve having a head in said socket and a stem in said cavity, and a valve seat between said socket and said cavity, the improvement which comprises an annular retainer for said valve seat, a cap screwed into said cavity having a larger bore surrounding said retainer and a smaller bore with an internal annular shoulder therebetween engaging the top of said reainer, said valve stem having a bearing slideable in said smaller cap bore and a shoulder normally in register with said cap shoulder and forming within the top of said retainer an annular recess, and a ring of flexible packing material in said annular recess having an inner annular flange engaging said stem below the bottom of said bearing and an outer annular flange sealing against said retainer below the bottom of said smaller bore sealing against leakage between said bearing and said retainer from said cavity.

4. In a pressure regulator comprising a body having a cavity for fluid under pressure to be regulated, a socket formed in said cavity and having an outlet for pressure regulated fluid, a valve having a head in said socket and a stem in said cavity, a valve seat between said socket and said cavity, the improvement which comprises an annular retainer for said valve seat, a cap screwed into said cavity having a larger bore surrounding said retainer and a smaller bore with an internal annular shoulder therebetween engaging the top of said retainer, said valve stem having a bearing slideable in said smaller cap bore and a shoulder normally in register with said cap shoulder and forming within the top of said retainer an annular recess, and a ring of packing material in said annular recess having an inner annular flange engaging said stem below the bottom of said bearing and an outer annular flange sealing against said retainer below the bottom of said smaller bore, and a web between the bottom of said bearing and said smaller bore and connecting said inner and outer flanges sealing against leakage between said bearing and said retainer from said cavity.

References Cited in the file of this patent
UNITED STATES PATENTS

| | | |
|---|---|---|
| 646,428 | Hardie | Apr. 3, 1900 |
| 880,402 | Reynolds | Feb. 25, 1908 |
| 941,153 | Krichbaum | Nov. 23, 1909 |
| 2,089,144 | Work | Aug. 3, 1937 |
| 2,707,966 | Taplin | May 10, 1955 |
| 2,820,469 | Seeler | Jan. 21, 1958 |
| 2,872,221 | Burns | Feb. 3, 1959 |
| 2,888,027 | Gerwig | May 26, 1959 |
| 2,963,040 | Zimmer | Dec. 6, 1960 |